Figure 1:
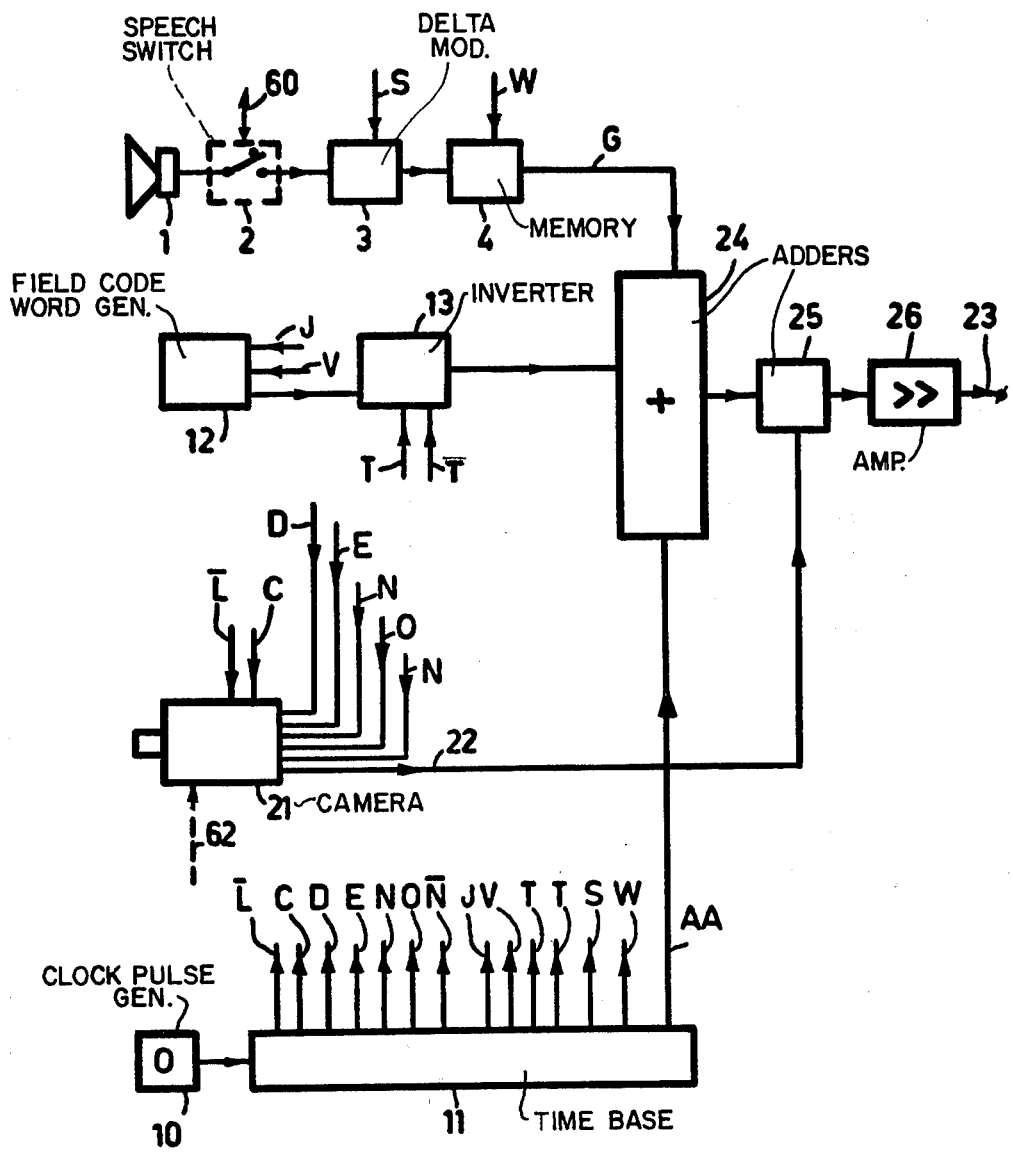

United States Patent [19]

Verhoeckx et al.

[11] 4,005,265

[45] Jan. 25, 1977

[54] VIDEOPHONE SYSTEM SYNCHRONIZER

[75] Inventors: Nicolaas Alphonsus Maria Verhoeckx, Emmasingel; Herman van der Hoff, Hilversum; Cornelis Henricus Johannes Vos; Johannes Wilhelmus Coenders, both of Emmasingel, all of Netherlands

[73] Assignee: U.S. Philips Corporation, New York, N.Y.

[22] Filed: Dec. 19, 1974

[21] Appl. No.: 535,044

Related U.S. Application Data

[63] Continuation of Ser. No. 382,897, July 26, 1973, abandoned, which is a continuation of Ser. No. 195,321, Nov. 3, 1971, abandoned.

[30] Foreign Application Priority Data

Nov. 13, 1970 Netherlands ............... 7016628

[52] U.S. Cl. .................. 358/145; 358/148; 358/150

[51] Int. Cl.² ............................. H04N 5/10

[58] Field of Search ........... 178/69.5 TV, 69.5 F, 178/DIG. 4

[56] References Cited

UNITED STATES PATENTS

| | | | |
|---|---|---|---|
| 3,506,785 | 4/1970 | Harris | 178/69.5 F |
| 3,567,862 | 3/1971 | Carnt | 178/69.5 TV |
| 3,666,888 | 5/1972 | Sekimoto | 178/69.5 TV |

Primary Examiner—Howard W. Britton
Attorney, Agent, or Firm—Frank R. Trifari; Henry I. Steckler

[57] ABSTRACT

In a videophone system sound, video, synchronizing and signalling signals are to be transmitted through a single pair of telephone cables of existing telephone communications. In that case sound, synchronizing and signalling signals are transmitted in a digital form and the video signals are transmitted in an analog form. It is then possible to achieve optimum picture quality at the given bandwidth of the existing telephone communications. If for the given bandwidth the video signal were also digitalized, this would be at the expense of the picture quality. However, it is then necessary to transmit information regarding clock pulses for decoding at the receiver end. To be able to synchronize at the receiver end only on two frequencies instead of on clock pulse frequency, line frequency and field frequency, the information regarding the clock pulses is cotransmitted in such a manner that a clock pulse generator at the receiver end can be synchronized therewith which generator supplies clock pulses. A field code word is also transmitted during each field flyback period. In the receiver the regenerated clock pulses are divided in frequency in a divider stage and the divided signal is compared with the detected code word in a synchronizing verification circuit. As long as there is no phase equality between component signals and detected code word, an output signal from the verification circuit resets the divider stage.

9 Claims, 7 Drawing Figures

VIDEOPHONE SYSTEM SYNCHRONIZER

This is a continuation of application Ser. No. 382,897, filed July 26, 1973, now abandoned, which in turn is a continuation of application Ser. No. 195,321, filed Nov. 3, 1971, now abandoned.

The invention relates to a videophone system comprising at the transmitter end means for generating and transmitting synchronizing and video signals and at the receiver end a synchronizing circuit and means for processing and displaying the video signals.

Such a system is known from "Bell Laboratories Record," Vol. 47, No. 5 of May-June, page 140, left-hand column subtitle to second Figure. This known system in which both synchronizing and video signals are transmitted in an analog form has advantages as well as drawbacks. The advantage may be explained as follows. When introducing videophone systems, existing telephone paths are most preferred as regards the short distances. These pairs of telephone cables constituting a communication network which may provide the possibility of selecting paths. In fact, it would be a costly matter to provide new telephone cables. The available bandwidth of existing paths is approximately 1 MHz (see page 139 of said Record, table in right-hand column). If the video signal were to be recoded in a digital form, this involves a bit rate of 6.3 Mb/S, i.e. a bandwidth of more than 3 MHz. Consequently, a digitalized video signal cannot be transmitted through existing telephone paths unless loss of image quality is taken into the bargain. The latter is of course undesirable.

On the other hand the cotransmission of synchronizing signals in an analog form has, for transmission technical reasons, various drawbacks, to wit:

1. The synchronizing signals are located in the so-called blacker-than-black part of the peak-to-peak value of the overall signal and occupy approximately 30% of this peak-to-peak value while the video signals occupy the remaining 70%. If the synchronizing signals were digitalized, the overall peak-to-peak value would be reduced to 70%. In fact, digitalized synchronizing pulses may then be located during the line flyback period that part of the peak-to-peak value which is used for the (analogue) video signals during the line scan period. This is possible because in such a system time separation substitutes for amplitude separation. Since the peak-to-peak value may be lower when the information contents remain equal, the requirements imposed on the control of the final stages of the amplifiers used in the system are reduced.

2. A second drawback of a completely analog system is that relatively large amplitudes are required for the synchronizing pulses (see the above-mentioned 30% of the overall peak-to-peak value). This involves crosstalk of the synchronizing signals on other telephone cables of the local network. By digitalizing the synchronizing signals the amplitude of the synchronizing signal itself may be reduced considerably so that crosstalk does not occur or hardly ever occurs.

However, digitalization of the synchronizing signals involves problems as regards the required information to be transmitted at the transmitter end and as regards the use of this information for the synchronization at the receiver end. In fact, digitalization involves the introduction of clock pulses which must be coded (for example, pulse code modulation or delta modulation) so as to be able to transmit synchronizing information. In that case clock pulse synchronization must be realized at the receiver end instead of line and field synchronization required for the completely analog systems. Synchronization may of course be effected on all these 3 frequencies at the receiver end. It is then necessary to transmit both information regarding the clock pulse frequency and the line and field frequencies.

An object of the present invention is to provide a system in which only two of these frequencies are transmitted while it is yet possible at the receiver end to synchronise on two instead of three frequencies from the incoming signal.

In order to achieve this the system according to the invention is characterized in that at least the synchronizing signal is generated in a digital form and the video signal is generated in an analog form. The video system furthermore includes for this purpose a master clock pulse generator at the transmitter end for generating clock pulses having a pulse repetition frequency such that the master clock frequency can be derived therefrom at the receiver end, and a code word generator for generating at least one field code word during part of the field flyback period. The synchronizing circuit at the receiver end is provided for synchronizing the frequency of a clock pulse generator present at the receiver end and is followed by a divider stage for dividing the clock pulses generated by the last-mentioned clock pulse generator in accordance with line and field frequencies and optionally other required frequencies. A synchronizing verification circuit is provided at the receiver end for verifying the instant of occurrence of the received field code word detected by the code word detector and has a signal derived from the divider stage. At least one reset output of the verification circuit is connected to a reset input of the divider stage for resetting this divider stage in such a manner that an equal phase can be obtained between the detected code word and the component signal.

The invention is based on the following recognition. By selecting the frequency of the signal comprising information regarding the clock pulse frequency in such a manner that a clock pulse signal can be obtained therefrom at the receiver end, which clock pulse signal comprises a multiple of the double line frequency, the signals of line, field and other required frequencies can be obtained by a division from this clock pulse signal. Since the division ratio based on the various frequencies is known, they can be laid down in the divider stage. As a result the transmitted signal need not comprise any specific line synchronizing information. It is true that the selection of such a clock pulse frequency is known from United Kingdom Pat. Specification No. 1,089,551, but not the recognition that information regarding the line frequency need not be transmitted due to the use of a divider stage. In addition the system described in this United Kingdom Pat. Specification is a completely digital system so that information regarding the clock pulse frequency is also transmitted during the scan period. However, if the advantages of a digital-to-analog system are to be utilized (better image quality in case of equal bandwidth) the system according to the invention provides the possibility therefor.

An additional advantage of the system is the following. It is not necessary to transmit clock pulse information during each line flyback period. It is sufficient to cotransmit clock pulse information every second or third line flyback period. The synchronization of the clock pulse frequency can still be effected in a sufficiently stable manner if the time constant of the integration network in the loop of the clock pulse synchronizing circuit is sufficiently long. Since it is not compulsory to transmit clock pulse information during each line flyback period, there is time left for other signals such as signalling or test signals. Thus it is, for example, necessary to cotransmit a burst during the line flyback period for colour television so as to synchronize the auxiliary generator which can generate the chrominance subcarrier at the receiver end. It is then possible, for example, to transmit synchronizing information at every other line flyback period for the synchronization of said auxiliary generator and to transmit clock pulse information for the clock pulse synchronization during the remaining flyback periods. Another possibility is to combine the two last-mentioned forms of synchronizing information.

The system has the additional advantage that not only the synchronizing signals but also the sound signals can be transmitted in a digital form. As will be described hereinafter it is then even possible to transmit the complete signal, synchronization, sound, signalling (in digital form) and video (in analog form) via a single pair of cables. The digitalized signals can then be decoded at the receiver end without any difficulty with the aid of the synchronized clock pulse frequency.

Figure 2:
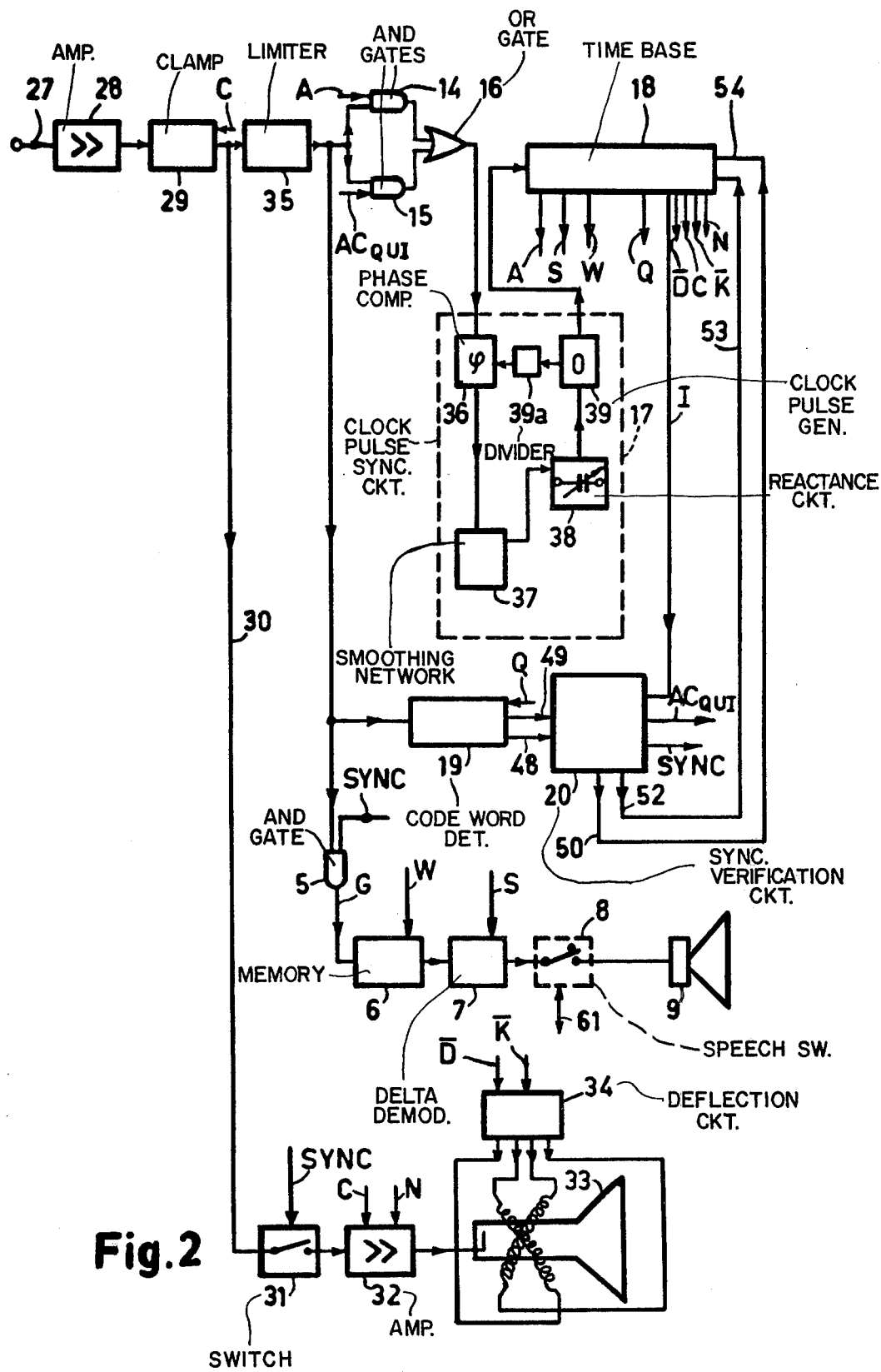
Figure 3:
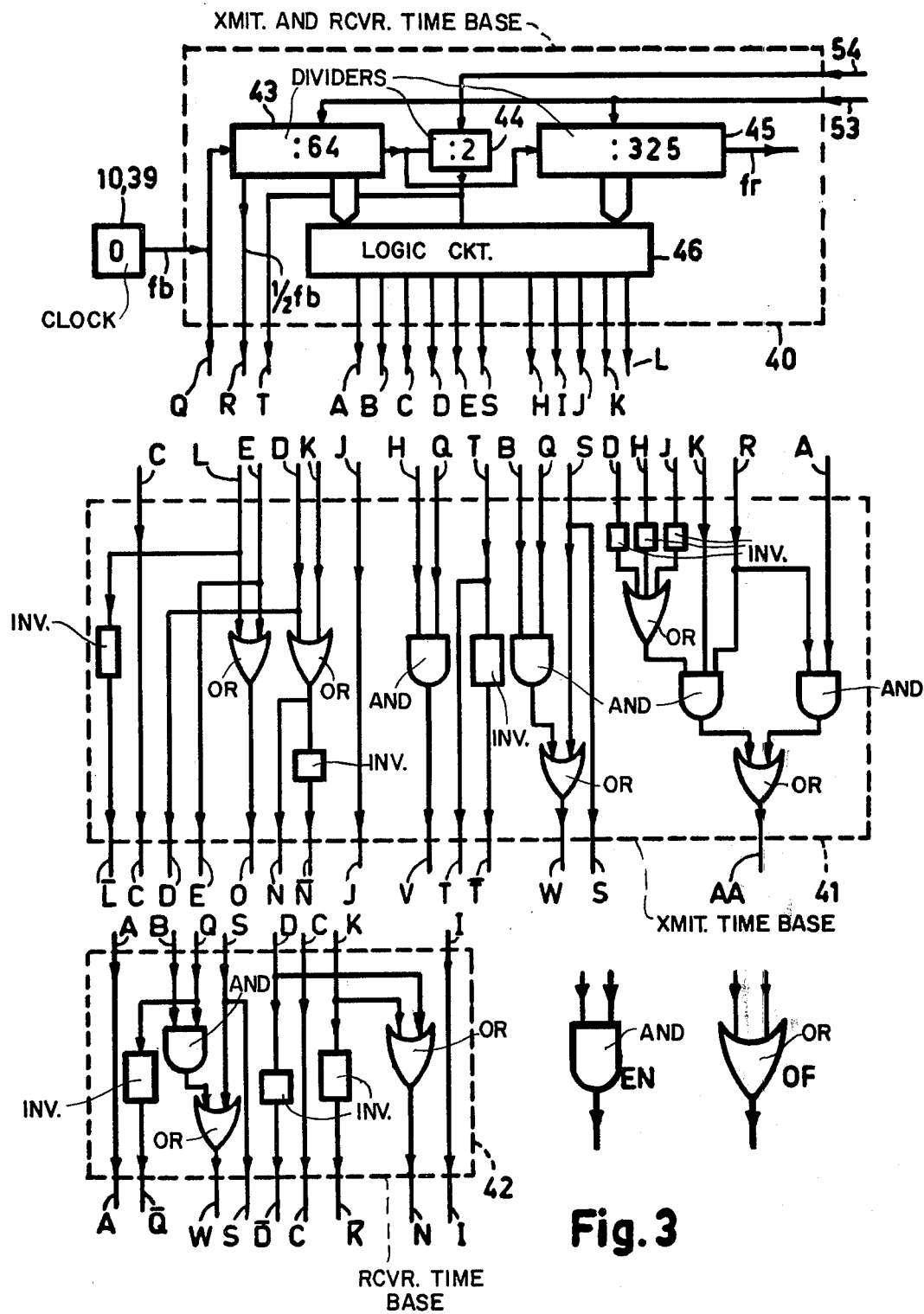
Figure 4:
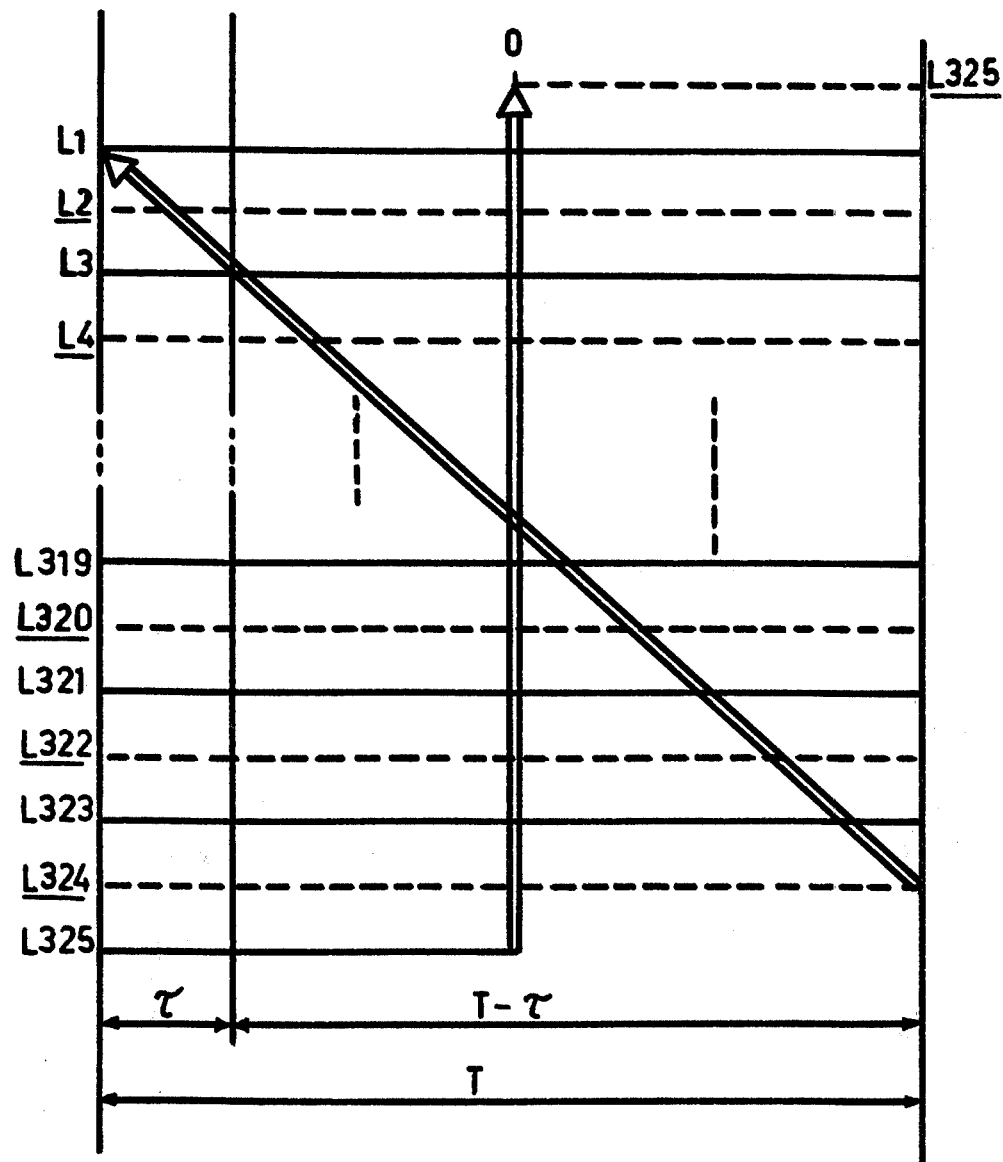
Figure 5:
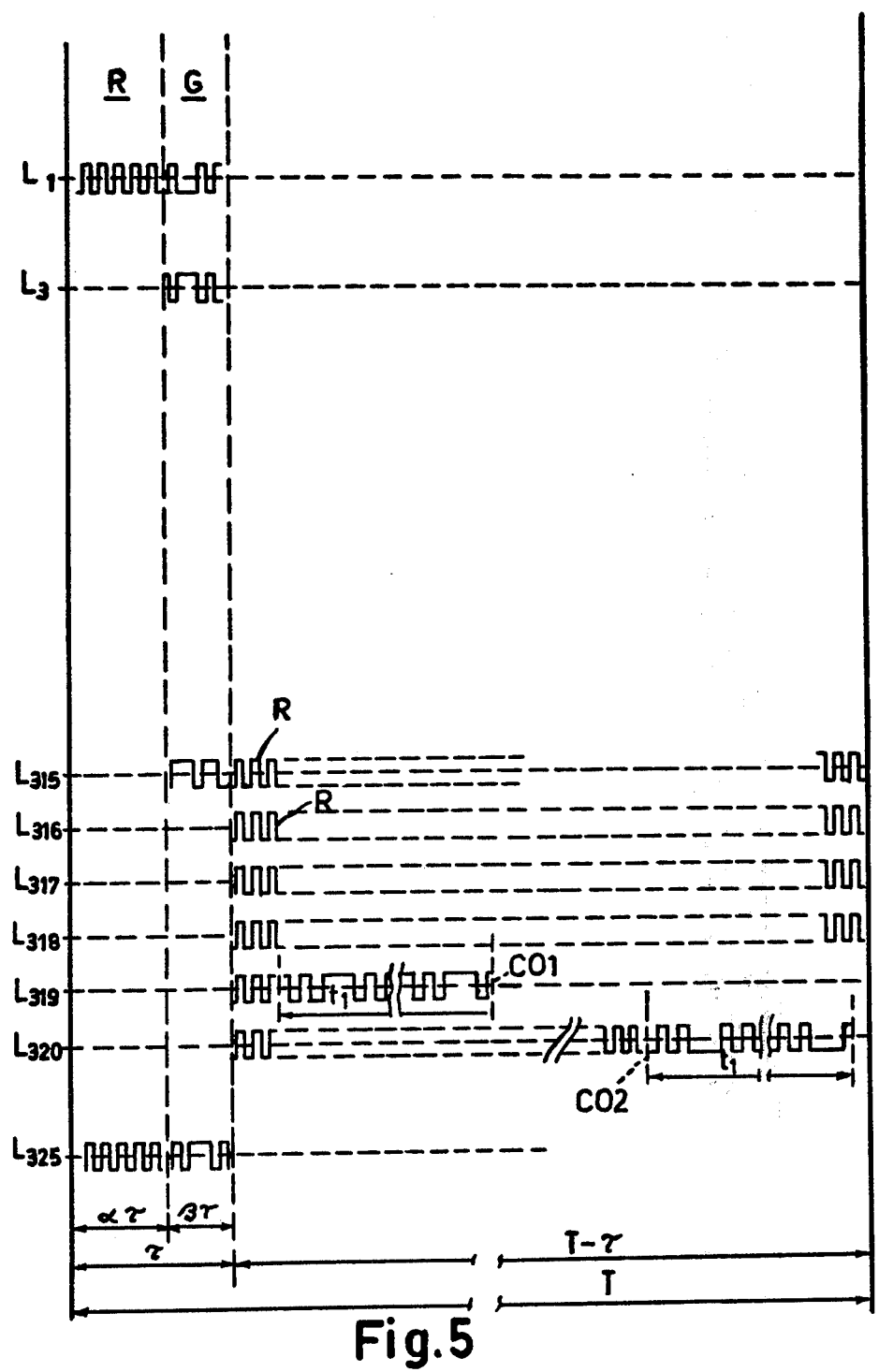
Figure 6:
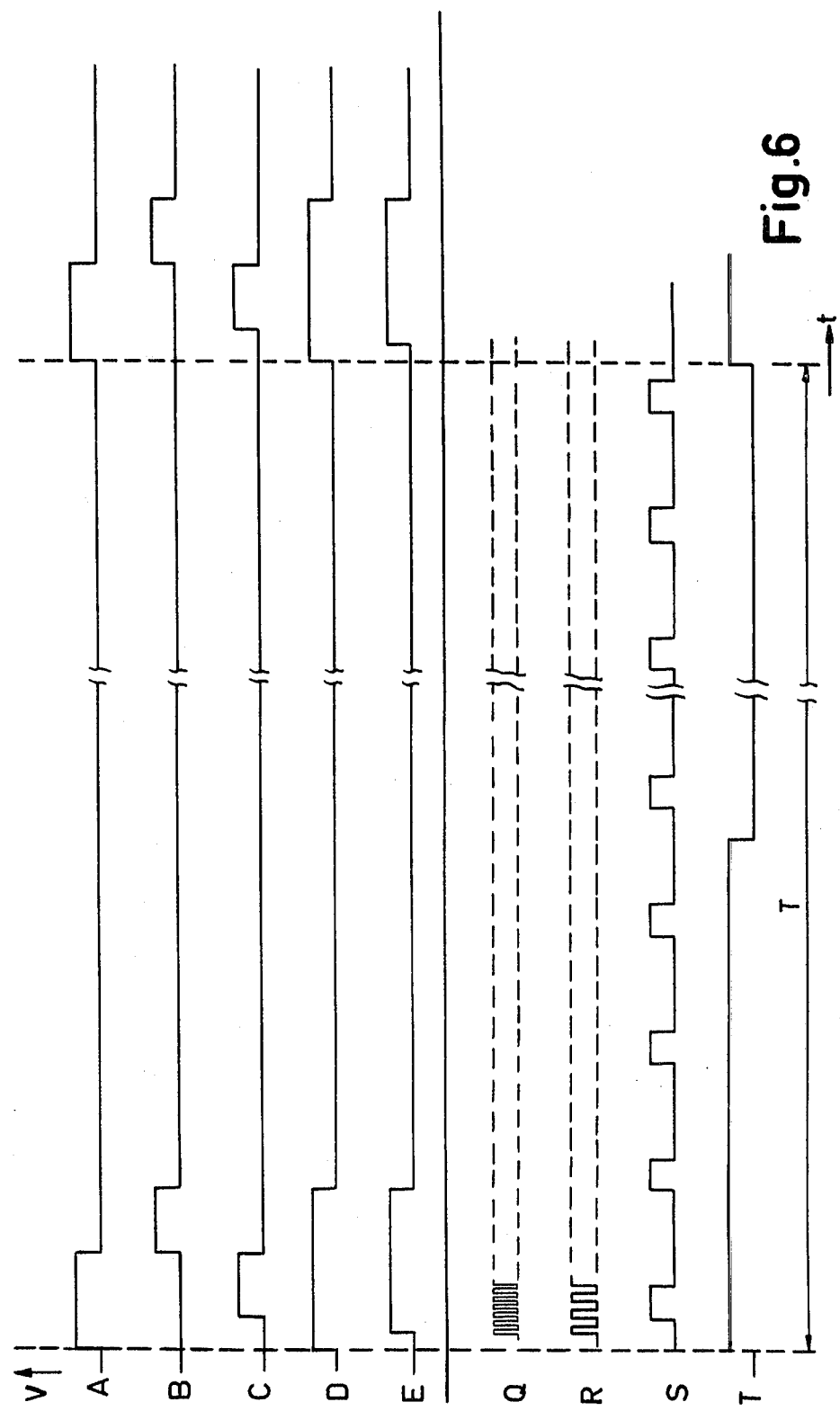
Figure 7:
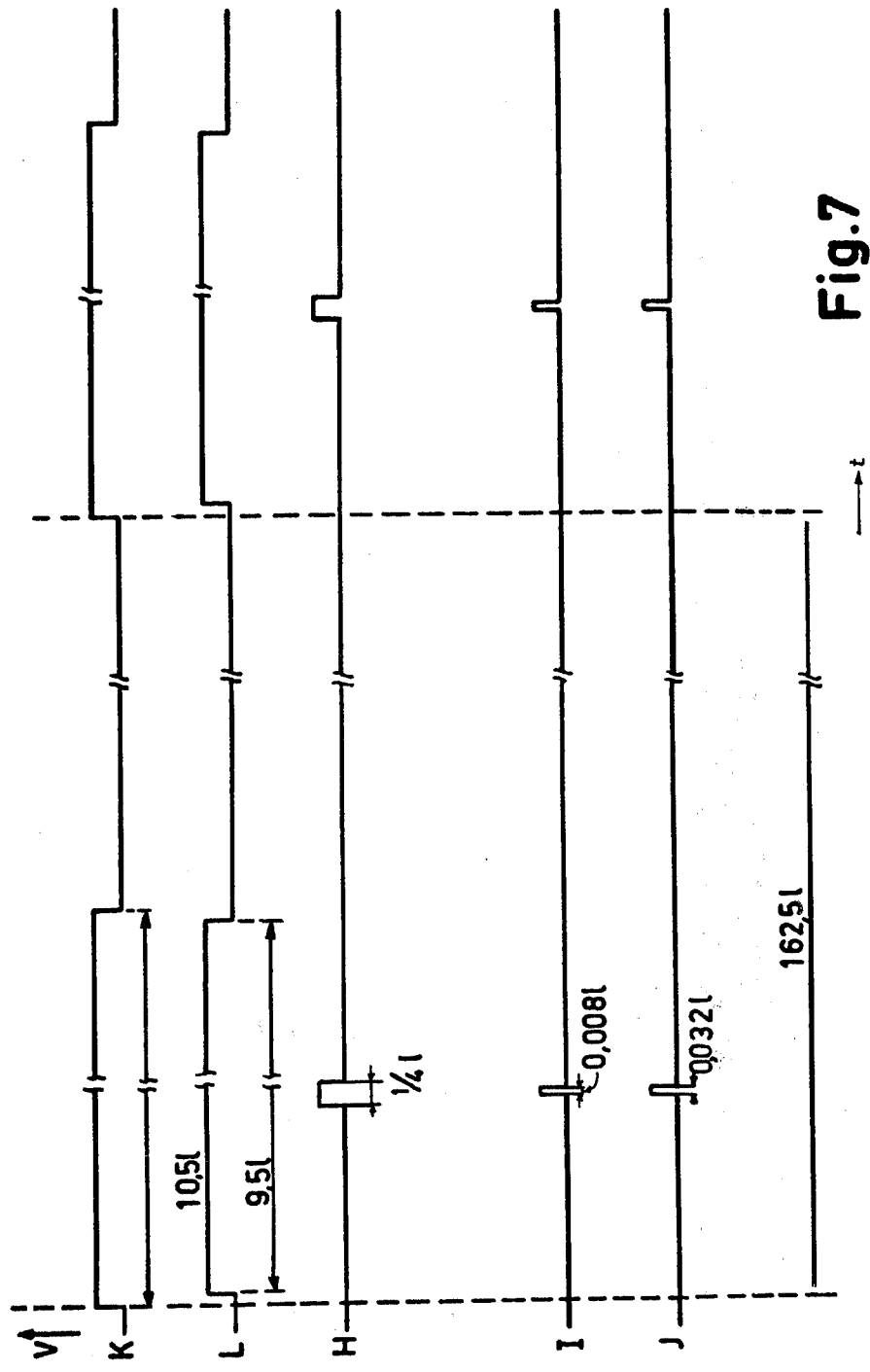

In order that the invention may be readily carried into effect, some embodiments thereof will now be described in detail by way of example with reference to the accompanying diagrammatic drawings in which:

FIG. 1 shows the structure in a block schematic diagram of the transmitter in a videophone unit, FIG. 2 shows the structure of the receiver in a videophone unit, FIG. 3 shows the time base for generating the various pulsatory signals both for the transmitter and for the receiver, FIG. 4 shows the structure of the image as is used for such a videophone system, FIG. 5 is similar to FIG. 4 but also shows various pulsatory signals which are used in this system, FIG. 6 shows line frequency and continuously present time base signals and FIG. 7 shows field frequency time base signals.

It is to be noted that transmitter and receiver will hereinafter be described interchangeably and that each videophone unit comprises both a transmitter and a receiver section according to FIGS. 1 and 2. Generally the transmitter in the videophone unit of the subscriber who calls synchronizes the receiver in the videophone unit of the subscriber called, and conversely. However, to render adjustment or correction of its own camera possible at the commencement of and during each communication, the videophone unit includes switches which can connect the time base of its own transmitter to its own receiver section. The camera can then be adjusted in a correct manner so that it is ensured that the image has a sufficient definition and that the camera is directed correctly.

The sound section in the transmitter comprises a microphone 1, a speech switch 2, a delta modulator 3 and a so-called eight-bit buffer memory 4. The corresponding sound section in the receiver comprises an AND-gate 5, an eight-bit buffer memory 6, a delta demodulator 7, a speech switch 8 and a loudspeaker 9.

As will be explained hereinafter the sound section of the transmitter is to cooperate with the sound section of the receiver which is ensured with the aid of the synchronizing system used in this case. As already described in the preamble clock pulses and signals derived therefrom must be generated by means of the transmitter for the synchronization of the receiver and for other purposes. This is effected in the transmitter by means of a master clock pulse generator 10 and the time base 11. A field code word generator 12 and an inverter stage 13 are also present at the transmitter end which ensure by means of pulsatory signals T and $\overline{T}$ to be described hereinafter, i.e. the latter signal being logically inverted relative to the first, that during one field the field code word provided by code word generator 12 is passed and that this code word is passed in a logically inverted form during the second field.

The section required for synchronization at the receiver end which cooperates at the transmitter end with the section described hereinbefore comprises AND-gates 14 and 15, an OR-gate 16, a clock pulse synchronizing circuit 17 and a time base 18. Furthermore the synchronization requires a code word detector 19 and a so-called synchronization verification circuit 20. The latter may be assumed to be a kind of coincidence stage which will become apparent from the description hereinafter.

The system described is an analog-to-digital system. This means that the sound signal, synchronizing signal and signalling signals are cotransmitted in a digital form in the signal to be transmitted. The FIGS. do not illustrate the generation and the processing of the signalling signals because these are not essential for the invention. On the other hand the video signals are cotransmitted in an analog form. The latter has been done because the video signals in an analog form already require a rather large bandwidth. As described in the preamble, a maximum video frequency of 1 MHz is considered for the present system because a signal having such a bandwidth can be transmitted through existing pairs of telephone cables with only a few simple additional provisions. On the other hand if the video signal were to be transmitted in a digital form, the bandwidth of the actual video signal must be inevitably limited when the space of 1 MHz for the telephone cables remains the same. This leads to a poorer image quality. However, the system is built up in such a manner that, if desired, the analog-to-digital system which is combined in the first instance can be converted into a completely digital signal without any objection. To this end the video information is only to be recoded from an analogue to a digital form because all other information (sound, synchronization and signalling) is already present in a digital form. It is true that the bandwidth required for transmission is then larger, but this can be technically realised for the transmission between one telephone exchange and the other, which transmission is generally effected with the aid of broadband systems. The present system is therefore quite suitable to transmit the generated signal in an analog-digital form from the transmitter in the video unit of the subscriber who calls via already existing paths to the nearest exchange, to convert this signal in this exchange, if desired, into a completely digital signal, to transmit this signal via a broad-band system, to convert the signal in the receiver exchange into an analog-digital form while the signal can be transmitted in the latter form from the receiver exchange to the subscriber called, and conversely.

The video signal is generated with the aid of the camera 21. The signal 22 supplied by this camera is an amplitude-varying signal which includes a direct voltage component.

In order to combine all generated signals at the output terminal 23, the transmitter furthermore includes a first adder stage 24 in which exclusively digital signals are added, and a second adder stage 25 which adds digital and analog signals together. The signal thus combined is amplified in the output stage 26 and is electrically balanced relative to earth and subsequently applied to the output terminal 23 to which the outgoing cable pair of the telephone cable is connected.

It is to be noted that an earth lead is not shown in the transmitter nor in the receiver, but each transmitter and each receiver includes of course an earth lead.

The video signal reaches the subscriber called through the incoming cable pair on input terminal 27, is subsequently amplified and transformed in amplifier 28 into a signal which is asymmetrical relative to earth, and is subsequently applied to a clamping circuit 29 which restores the direct voltage component of the signal lost during transmission and from which the signal is directly applied through the lead 30 to a switch 31. From this switch the signal passes to a video amplifier 32 which applies the analog video signal to the display tube 33. The deflection signals for the display tube 33 are generated in a deflection circuit 34. Of course the display section at the receiver end consisting of the parts 31, 32, 33 and 34 cooperates with the camera 21 at the transmitter end. Therefore the analog video signal is generated and processed through the last-mentioned parts. The digital signals at the receiver end are first of all passed through the limiter 35 and subsequently to the synchronizing and sound section as well as to the signalling section not shown.

It is to be noted that the clock pulse synchronizing circuit 17 itself consists of a phase comparison stage 36, a smoothing network 37, a reactance circuit 38, a clock pulse generator 39 and a two-to-one divider 39a.

FIG. 3 shows the time base circuit 11 of the transmitter and the time base circuit 18 of the receiver in greater detail.

Both the time base 11 and the time base 18 actually consist of 2 parts, one part 40 which is identical for both and a block 41 for the transmitter as well as a block 42 for the receiver. This means that the time base 11 consists of the parts 40 and 41, and the time base 18 consists of the parts 40 and 42.

The part 40 comprises a first divider stage 43 which divides the clock pulse signal received from clock pulse generators 10 and 39 by 64, a second divider stage 44 which divides the signal received from divider stage 43 by 2 and a third divider stage 45 which divides the signal received from divider stage 43 by 325.

FIG. 3 shows for block 40 that the clock pulse signal has a frequency $f_b$ which is equal to 1.04 MHz, which signal is available at the output Q. Furthermore the frequency $½ f_b$ is indicated at the output R, which implies that the clock frequency at that point is divided by 2. This signal R is the signal which is ultimately passed through the lead and hence the two-to-one divider 39 is required at the receiver end so as to divide the pulse signal of frequency $f_b$ generated by generator 39 by 2 so as to be able to compare it with the signal R of frequency $½ f_b$ received from the transmitter end. Finally the frequency $f_r$ which is the field frequency of 50 Hz is indicated at an output of the stage 45.

Various outputs of the divider stages 43, 44 and 45 lead to a logical circuit 46 which combines the various signals from these divider stages in known manner to the signals desired at the outputs and shown in FIGS. 6 and 7. This technique which is known per se will not be described, but it is sufficient to indicate characters at the inputs of the stage 41 which correspond to the characters at the outputs of the stage 40 to which the respective inputs of the stage 41 are connected. Characters whose significance can be found in Table I below are also indicated at the inputs of the stage 41.

The same applies to the stage 42 which is coupled to the stage 40 in the receiver section.

TABLE I

| type of signal | signal indication | pulse duration see also FIGS. 6 and 7 | purpose |
|---|---|---|---|
| line frequency signals $f_h$ = 8.125 KHz period = 123 μS = 128 bit | A | 12 bit = $\alpha\tau$ | clock pulse synchronization |
| | B | 8 bit = $\beta\tau$ | sound transmission |
| | C | 8 bit | clamping pulse |
| | D | 20 bit = $\tau$ | video blanking = line flyback |
| | E | 18 bit | camera line blanking |
| field frequency signals $f_r$ = 50 Hz | H | 32 bit = t1 | position of code word |
| | I | 1 bit | verification pulse |
| | G | 4 bit | position of signalling |
| | K | 10.5 line period | video field blanking = field flyback |
| | L | 9.5 line period | camera field blanking |
| continuously available signals | Q = 1.04 MHz | 50 % of period | clock pulse |
| | R = 520 KHz | 50 % of period | alternating ones and zeros |
| | S = 65 KHz | 25 % of period | sampling frequency for delta modulator and demodulator |
| | T = 8.125 KHz | 50 % of period | auxiliary signal for generating code words |
| combined signals | N = D + K | | overall video blanking |
| | O = E + L | | overall camera |

TABLE I-continued

| type of signal | signal indication | pulse duration see also FIGS. 6 and 7 | purpose |
|---|---|---|---|
| | W = B.Q + S | | blanking clock signal for sound buffer |
| | V = H.Q | | clock signal for code word generator |
| | AA = $\overline{K.R(\overline{D+H+J})}$ + A.R | | all alternating ones and zeros present in a field for the purpose of clock pulse synchronization |

The characters used in Table I serve both for the indication of the various outputs and inputs and for the indication of the signals occurring at the outputs. For an inverted signal the characters are provided with a stripe notation in the FIGS. as is common practice.

FIG. 4 shows the line pattern which is scanned in the camera tube at the transmitter end and in the display tube at the receiver end while assuming an instantaneous flyback. FIG. 4 shows that the total image consists of 325 lines which are subdivided in two fields of 162.5 lines each. The lines 1, 3, 5 up to and including the first half of line 325 constitute the odd field while the last part of line 325 and the lines 2, 4 up to and including 324 constitute the even field. As is known this is a 2-to-1 interlacing as is common practice for television techniques. The picture frequency is 25 Hz and therefore the field frequency $f_r$, as indicated, is 50 Hz. This results in a line frequency of 8.125 KHz and hence a line duration of approximately 123 $\mu$sec for which a time $\tau$ which is approximately equal to 20 $\mu$sec for the line flyback. The clock pulse frequency $f_b$ is chosen in the upper part of the transmission band of approximately 1 MHz namely at 128 × 8.125 KHz = 1.04 MHz. In the system used two types of signals are transmitted during the line flyback period $\tau$, i.e. during the portions $\alpha\tau \approx 12$ $\mu$sec signal R is transmitted from which at the receiver end the clock pulse frequency $f_b$ can be recovered in a simple and reliable manner from the clock pulse synchronizing circuit 17.

As will be explained hereinafter the signal R transmitted during the period $\alpha\tau$ serves for synchronizing the synchronizing circuit 17 when this circuit is in its on-synchronizing state. This means that for such a state the signal derived from stage 35 passes through the gate 14 which is gated by the signal A derived from time base 18 in such a manner that it passes the signal derived from limiter 35 during the portion $\alpha\tau$ of the line flyback period $\tau$. Running in the synchronizing circuit 17 and also for the case where the circuit 17 might be in an off-synchronizing state it is possible, for example, to transmit the signal R not only during a portion $\alpha\tau$ of the line flyback period $\tau$ but also during at least a portion of the line scan period T - $\tau$ occurring in a field flyback period. This is indicated for the odd fields in FIG. 5 for the lines $L_{315}$, $L_{317}$ and $L_{319}$ and for the even fields for the lines $L_{316}$, $L_{318}$ and $L_{320}$. Furthermore FIG. 5 shows that a code word $CO_1$ is transmitted on line $L_{319}$ during a period $t_1$ and a second code word $CO_2$ is transmitted during the line $L_{320}$. These field code words are generated in known manner at the transmitter end of the code word generator 12 and are spaced apart over exactly one field period.

The operation of the synchronization is as follows. In the first place the run-in problem will be referred to. This run-in is possible because the pulsatory signal R is provided over a comparatively long period after the commencement of a field flyback and before the code word occurs. This is because it must first be ensured that the synchronizing circuit 17 is synchronized in the correct manner so that generator 39 provides clock pulses of the correct frequency before the code words $CO_1$ and $CO_2$ occur. In fact, it is more difficult to recognize this code word as the code word detector 19 receives clock pulses from time base 18 which deviate more in frequency from the frequency $f_b$ at the transmitter end. In addition gate 15 is closed as from the first time of detection of a field code word and gate 14 is keyed by signal A. When at that instant of the first detection of the field code word generator 39 is not exactly synchronized there is the risk that this keying by signal A is not effected in the correct manner and that for the subsequent field flyback period the verification pulse I from time base 18 and the detection of the next incoming field code word does not coincide so that no synchronization is achieved. The signal during the field scan period is an analog video signal which does not contain any information regarding the clock pulses. In addition the direct voltage component of the combined signal has been lost during transmission while this direct voltage component is indispensable for the detector of the code words. In the synchronized state the direct voltage component in clamping circuit 29 is restored with the aid of keying pulses C originating from time base 18. However, as long as synchronization is not achieved the keying pulses C will not occur at the correct instants and will not correctly restore the direct voltage component during the field scan period because they may then coincide with the video signal. However, when the first lines of the field flyback period are filled with a signal which is more or less constant on the line and when each field is the same, the clamping circuit 29 may run in on this during the on-synchronization period. Therefore the signal R is provided during the said long period preceding the code words $CO_1$ and $CO_2$, firstly to give the clamping circuit 29 the opportunity to determine the direct voltage component at its correct value and secondly to ensure that the code word 19 is keyed in the correct manner. When the clock pulse generator 39 is synchronized in the correct manner, the code words $CO_1$ and $CO_2$ may be detected by the code word detector 19 and a pulse will occur at the output 48 when the code word $CO_1$ occurs and a pulse will occur at the output 49 when the code word $CO_2$ occurs. When the pulses derived from the outputs 48 and 49 have coincided over a given minimum number of times with the pulses of signal I originating from time base 18, the synchronizing verification circuit 20 provides a pulse for the output SYNC during at least one field period, which pulse is applied to the inputs and AND-gate 5 and switch 31, respectively, so that these gates will pass the sound signal and the video signal, respectively, to the relevant parts of the receiver. With this it is achieved that these parts only receive a signal when there is sufficient certainty regarding the on-synchronizing state.

The signal I originating from the output I will, however, only coincide with the signals originating from outputs 48 and 49 when the divider stages 43, 44 and 45 from block 40 of the receiver synchronously share the clock pulse signal with the stages 43, 44 and 45 from the associated transmitter. In fact, as has been described, it is necessary to synchronize on two frequencies derived from the incoming signal, namely on the clock pulse frequency by the circuit 17 and on the field frequency with the aid of the field code word after division of the clock pulse frequency. Since division cannot be effected without phase ambiguity, it must be verified whether these divider stages actually provide the correct frequency in the correct phase. Consequently, when the pulse from output I does not coincide with the respective pulses at the outputs 48 and 49, the outputs 50 and 52 of the synchronizing verification circuit 20 will pass pulses to the inputs 53 and 54 of block 40 at the receiver end which reset the divider stages 43, 44 and 45 so that from now on the pulse from output I coincides with the respective pulses from outputs 48 and 49 so that synchronization is achieved between transmitter and receiver. As long as the synchronizing verification circuit decides that synchronization between transmitter and receiver has not been established, a signal ACQUI is provided which continuously maintains gate 15 open. As soon as synchronization is reached, the synchronization verification circuit applies a signal to output SYNC which is the logical inverted signal of signal ACQUI and thus closed gate 15 and also opens gates 5 and 31. In that case signal A from time base 18 has the correct phase to open the AND-gate 14 so that the incoming signal R reaches the synchronizing circuit 17 exclusively during the part $\alpha\tau$ of the line flyback period $\tau$ through the AND-gate 14 and the OR-gate 16. As FIG. 2 shows, the output of limiter 35 is directly connected to the code word detector 19 so that during each field flyback period one of the code words $CO_1$ or $CO_2$ is compared with the signal originating from the output I. Consequently, as soon as an off-synchronizing state occurs, phase equality between the respective signals at the outputs 48 and 49 with those at output I is no longer present and the signal ACQUI will appear again so that again a synchronizing state is sought.

Furthermore FIG. 2 shows that the synchronizing circuit 17 includes a smoothing network 37 which ensures a satisfactory flywheel operation. This may be fruitfully utilized by not cotransmitting the signal R during each line flyback period $\tau$ and particularly during the part $\alpha\tau$ as is shown in FIG. 5. For example, this signal R may be transmitted every other line flyback period and other signals may be transmitted during the remaining line flyback periods which signals serve, for example, for the synchronization of a subcarrier generator for generating a subcarrier signal in the case when the videophone system transmits a colored image.

Finally it is to be noted that instead of using the clamping circuit 29 which serves inter alia for determining the direct voltage component during the field flyback period when running in or reaching the on-synchronizing state is concerned, it is alternatively possible to use a highpass filter which filters the signal R independently of the direct voltage level of the incoming signal in such a manner that it can be applied to the synchronizing circuit 17. The main problem of running-in is the presence of signal R during the field flyback period for deriving the direct voltage level on the one hand and for causing the circuit 17 to reach the on-synchronizing stage on the other hand. Once the correct synchronization has been established, the sound signal can also be released. In fact, as is shown in FIG. 5, the sound signal G is transmitted during the part $\alpha\tau$ of the line flyback period $\tau$. This sound signal is established at the transmitter end as follows. The signal derived from the microphone 1 is passed on or not passed on in the speech switch 2. The speech switch 2 is provided with an input 60 which is connected through a comparative circuit not shown to the input 61 of the speech switch 8 in the same videophone unit, that is to say, of the own receiver. The intensity of the signal provided by loudspeaker 9 is compared so as to find out whether it is larger than the intensity of the sound signal coming in through the microphone 1 and independently thereof the switch 2 is opened or closed. In fact, this is necessary in loudspeaking telephone systems as in the present system because there is no telephone receiver as in the common telephone sets but a separate microphone and a separate loudspeaker so that the risk of acoustic feedback increases considerably.

The signal from speech switch 2 is applied to the delta modulator 3 which is sampled by means of the signal S originating from time base 11. Therefore a delta-modulated signal is produced at the output of stage 3, which signal is compressed in time in the 8-bit buffer memory 4 which is written in and read out by means of the signal W. Consequently it is possible to transmit the entire sound information associated with one line period during the short period $\beta\tau$.

The opposite is effected at the receiver end. The receiving signal G is expanded in time in the eight-bit buffer memory 6, subsequently demodulated in the delta demodulator 7 and finally reaches the loudspeaker 9 through the speech switch 8. Therefore the signals W and S are also necessary in this case for time expansion and demodulation, respectively. If there were no synchronization between the clock pulse frequencies of transmitter and receiver, expansion as well as demodulation could not be established in the correct manner.

As regards the transmitter the following is to be noted. The input 62 of the camera 21 serves for focussing the objective lens of this camera and for giving the camera itself the correct direction. As already noticed hereinbefore, this is necessary to ensure from the commencement of the communication that the camera is adjusted in the correct manner.

Furthermore the following applies to the receiver section. The video amplifier 32 receives two signals C and N from the time base 18. The signal N is the overall video blanking by which it is ensured in stage 32 that video information is not applied to the display tube 33 during the line flyback period and the field flyback period. The signal C is a clamping pulse which can ensure together with a clamping circuit present in amplifier 32 that the direct voltage level in the signal is again introduced, if necessary. The deflection circuit 34 receives the signals $\overline{D}$ and $\overline{K}$ which, as is shown in Table I, represent the logically inverted line flyback pulses and the logically inverted field flyback pulses, respectively. These ensure that the correct currents flow through the deflection coils of the display tube 33 via the deflection circuit 34. In this manner it is achieved that the deflection in the display tube 33 is effected synchronously with the deflection in camera 21.

What is claimed is:

1. A transmitter comprising means for transmitting in analog form a line and field scanned video signal requiring three synchronization signals at a receiver for proper display; means for transmitting only two of said synchronization signals comprising a clock pulse generator means coupled to said transmitting means for generating clock pulses having a frequency from which field and line frequencies are derivable and a code word generator coupled to said transmitting means for generating at least one field code word phase synchronized with said clock pulses during the field flyback period; whereby at said receiver line and field synchronizing signals can easily be extracted from said clock frequency for display of said video signal.

2. A transmitter as claimed in claim 1 further comprising means for ensuring that said clock pulses, audio signal, signalling signals and said code word are digitally transmitted during a flyback period and that said video signal is transmitted in analog form during the line and field scan periods.

3. A transmitter as claimed in claim 1 further comprising a frequency divider means coupled to said clock generator, gate means coupled to said clock generator, said divider, and said transmitting means for passing said divider and said clock pulses every $n^{th}$ line flyback period, wherein $n$ equals an integer greater than 2.

4. A transmitter as claimed in claim 1 wherein said code word generator comprises means for generating different code words during even and odd fields.

5. A transmitter as claimed in claim 4 wherein said different code words comprises logically inverted with respect to each other code words.

6. A transmitter as claimed in claim 1 further comprising an inverter means coupled between said field code word generator and said transmitting means for inverting said code word during alternate fields.

7. A transmitter as claimed in claim 6 wherein said inversion takes place during the even field.

8. A receiver for composite signal having a line and field scanned analog video component and a synchronization component having only two synchronization signals said synchronization signals respectively comprising a digital clock pulse component having a frequency from which field and line frequencies are derivable, and a digital field code word component phase synchronized with said clock pulse component during the field flyback period; said receiver comprising code word detector means adapted to receive said transmitted code words and for supplying same; a clock pulse generator means; means coupled to said clock generator for synchronizing said generator; a frequency divider coupled to said clock generator for providing at least the line and field synchronization signals from said clock pulses; and a synchronization verification means having inputs coupled to said code word detector and said divider respectively; and an output means coupled to a reset input of said divider for resetting said divider to obtain phase equality between said detected and transmitted code word.

9. A receiver as claimed in claim 8 wherein said field code words transmitted during the even and odd fields differ from each other, said code word detector comprising two output means coupled to said verification circuit for providing output signals when said even and odd field code words are detected respectively, and said verification circuit comprising two output means coupled to said divider if said divider is dividing with an incorrect phase.

* * * * *